United States Patent
Toda et al.

[11] Patent Number: 5,463,517
[45] Date of Patent: Oct. 31, 1995

[54] MAGNETORESISTANCE HEAD HAVING A REGULARLY-SHAPED GAP

[75] Inventors: Junzo Toda, Kawasaki; Susumu Aoyama, Fukuyama, both of Japan

[73] Assignee: Fujitsu Limited, Kawasaki, Japan

[21] Appl. No.: 187,680

[22] Filed: Jan. 28, 1994

[30] Foreign Application Priority Data

May 17, 1993 [JP] Japan .................... 5-114735

[51] Int. Cl.⁶ .................... G11B 5/39; G11B 5/127
[52] U.S. Cl. .................... 360/113
[58] Field of Search .................... 360/113

[56] References Cited

U.S. PATENT DOCUMENTS

| | | | |
|---|---|---|---|
| 4,754,354 | 6/1988 | Jeffers | 360/113 |
| 4,807,073 | 2/1989 | Takeura et al. | 360/113 |
| 5,291,363 | 3/1994 | Somers | 360/113 |
| 5,296,987 | 3/1994 | Anthony et al. | 360/113 |
| 5,331,493 | 7/1994 | Schwarz | 360/113 |

FOREIGN PATENT DOCUMENTS 61-267914  11/1986  Japan .
3-30107  2/1991  Japan .

*Primary Examiner*—John H. Wolff
*Attorney, Agent, or Firm*—Armstrong, Westerman, Hattori, McLeland & Naughton

[57] ABSTRACT

The ends of lead conductor layers, which ends mark the boundaries of a signal detection area are made substantially perpendicular in the vicinity of a magnetoresistance element, and are sloped in the vicinity of an upper shield so that the lead conductor layers are thicker away from the signal detection area; a recording gap is a regularly shaped gap at least over a spatial range corresponding to a signal detection area.

4 Claims, 5 Drawing Sheets

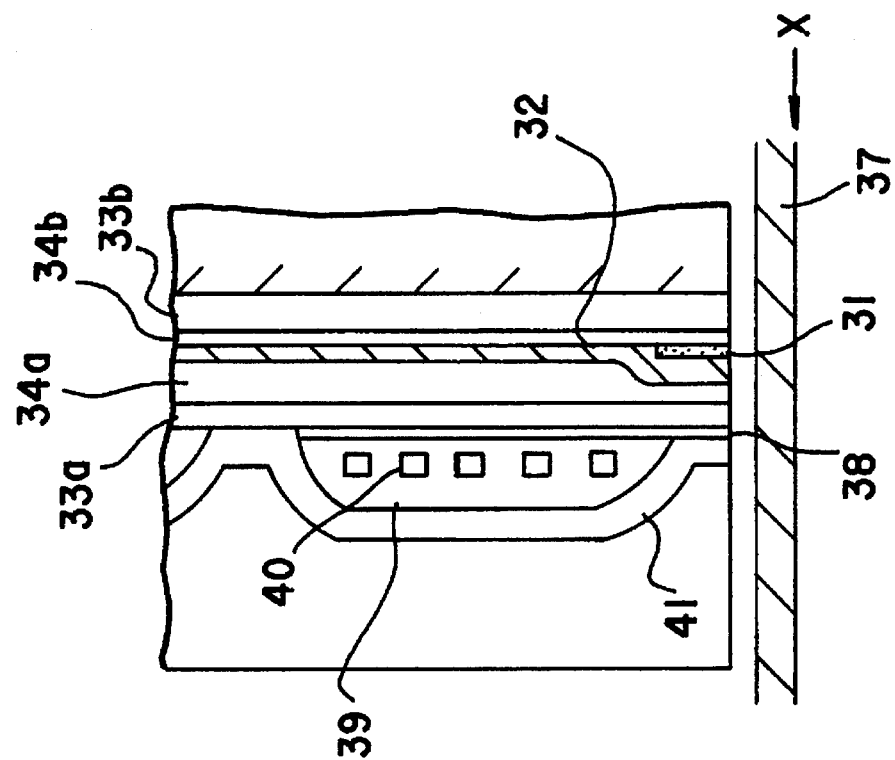
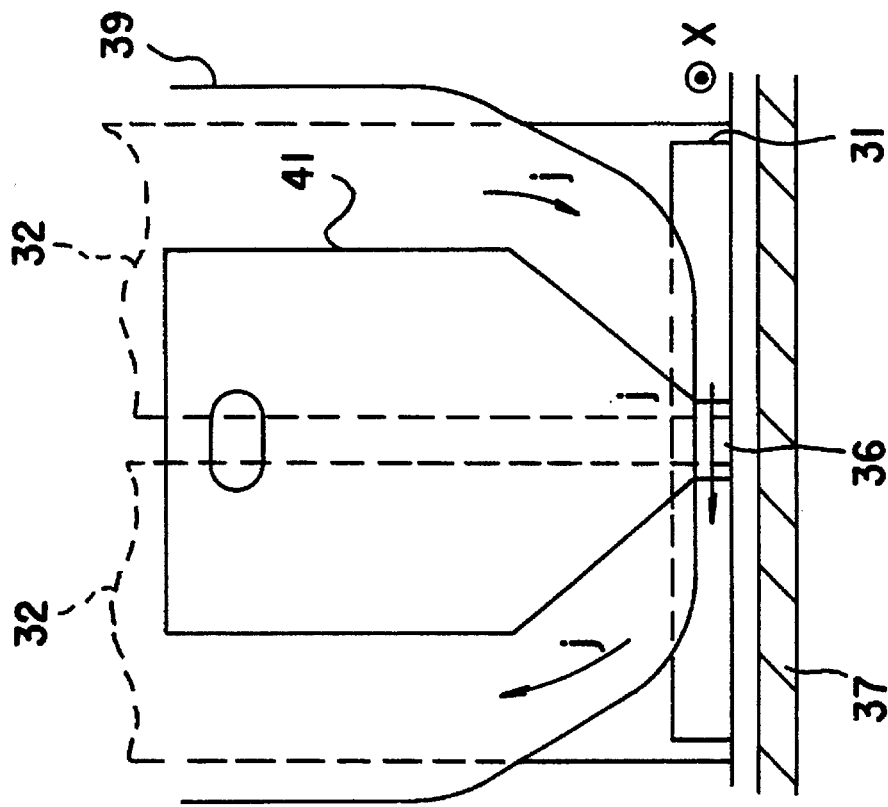

MAGNETORESISTANCE HEAD HAVING A REGULARLY-SHAPED GAP

BACKGROUND OF THE INVENTION

This invention generally relates to a magnetoresistance head for use in a magnetic disk drive and to a method of fabricating the same.

Recently, with the increase of the capacity of a magnetic disk drive used as an external storage device for a computer, there is a demand for a high-performance magnetic head. A magnetoresistance head (MR head), which allows high-level output to be obtained irrespective of the speed at which the recording medium is run, is recognized as being capable of meeting such a requirement.

FIGS. 1A and 1B show a conventional MR head; FIG. 1A is a top view; and FIG. 1B is a cross sectional view. In the figures, a rectangular magnetoresistance element (MR element) 31 is connected to the ends of a pair of lead conductor layers 32. The MR element 31 and the lead conductor layers 32 are sandwiched by non-magnetic insulating layers 34a and 34b. The non-magnetic insulating layers 34a and 34b are sandwiched by an upper shield 33a and a lower shield 33b provided for magnetic shielding.

A sensing current j is allowed to flow through the lead conductor layers 32 and the MR element 31, to be fed to a signal detection area 36, in the MR element 31, defined by the lead conductor layers 32. The magnetic recording medium 37 is moved in the x-axis direction below the head so that the MR head can detect magnetic variations in the medium 37 as the variations in the electrical resistance of the signal detection area 36.

The upper shield 33a serves as a lower magnetic pole on which to provide a recording gap 38 formed of $Al_2O_3$. On top of the recording gap 38, there are formed an inter-layer insulating layer 39 made of thermosetting plastic, a thin-film Cu coil 40 and a magnetic pole 41 made of NiFe alloy film, in the stated order, so as to form a recording head.

As shown in FIG. 2A, the conventional MR head is constructed such that the lead conductor layers 32 formed on the MR element 31 become gradually thinner near the signal detection area 36. Therefore, there is a problem in that the resistance of the signal detection area 36 varies toward the ends thereof with the result that the signal detection area 36 is poorly defined.

There is also proposed an arrangement shown in FIG. 2B, adapted to improve the precision with which the signal detection area 36 is defined, wherein a non-magnetic insulating layer 34c is provided so as to be contiguous with the non-magnetic insulating area 34a so that the signal detection area 36 is defined with a distance d, which is the distance between two directly opposite points at which the MR element 31 is in contact with the lead conductor layers 32. However, this arrangement also has a problem in that irregularity in the linearity of the recording gap 38, provided between the upper shield 33a and the upper magnetic pole 41, is created over the distance d of the signal detection area 36, with the result that a poor frequency characteristic of the head is produced especially in the high-frequency range.

It is therefore an object of the present invention to provide an improved magnetoresistance head and a method of fabricating the same by which head and method the signal detection area of a magnetoresistance element is more precisely defined, and deterioration in the frequency characteristic is prevented.

SUMMARY OF THE INVENTION

In accordance with the invention, there is provided a magnetoresistance head in which a pair of lead conductor layers are connected to ends of a magnetoresistance element so as to define a signal detection area; the magnetoresistance element and the lead conductor layers are sandwiched by an upper and lower shields with a first insulating layer residing between the upper shield and the lead conductor layer and a second insulating layer residing between the lower shield and the magnetoresistance element; and an upper magnetic pole is provided opposite the upper shield via a third insulating layer so as to form a recording gap, wherein ends of the lead conductor layers, which ends mark the boundaries of the signal detection area, are substantially perpendicular in the vicinity of the magnetoresistance element, and are sloped in the vicinity of the upper shield so that the lead conductor layers become gradually thicker away from the signal detection area, and the recording gap is a regularly shaped gap at least over a spatial range corresponding to the signal detection area.

In another aspect of the present invention, there is provided a method of fabricating a magnetoresistance head, the method comprising the steps of:

after a process whereby a lower shield, a second insulating layer, a magnetoresistance element and a first insulating layer are sequentially formed upon a substrate, forming a resist pattern having the form of an inverted trapezoid, in correspondence to a signal detection area, forming the first insulating layer by an etching process that utilizes the resist pattern, forming first metal layers on the magnetoresistance element by applying a method characterized by excellent step coverage on the resist pattern, so that the metal layers formed have the same thickness as that of the first insulating layer, forming second metal layers on the first metal layers by a method characterized by poor step coverage, so as to complete lead conductor layers, lifting off the resist pattern, and further building up the first insulating layer on the already-formed first insulating layer and on the lead conductor layers, and then forming, thereupon, an upper shield, a third insulating layer and an upper magnetic pole, in the stated order.

Since the lead conductor layers have substantially perpendicular ends in the vicinity of the magnetoresistance element, the precision with which the signal detection area is defined is improved as compared to the conventional technology. Further, the deterioration in the frequency characteristic is prevented because the recording gap is a regularly shaped gap at least over a spatial range corresponding to the signal detection area.

The present invention ensures that the ends of the lead conductor layers are substantially perpendicular in the vicinity of the magnetoresistance element, and are sloped in the vicinity of the upper shield so that the lead conductor layers are gradually thicker away from the signal detection area; and that the recording gap is a regularly shaped gap at least over a spatial range corresponding to the signal detection area, by means of a process whereby the first insulating layer is formed by an etching process utilizing a resist pattern; the resist pattern is lifted off after the first and second metal layers are formed; and the forming of the first insulating layer is then resumed.

BRIEF DESCRIPTION OF THE DRAWINGS

FIG. 1A is a top view of a conventional head;

FIG. 1B is a cross sectional view of a conventional head;

DETAILED DESCRIPTION

Figure 2A:
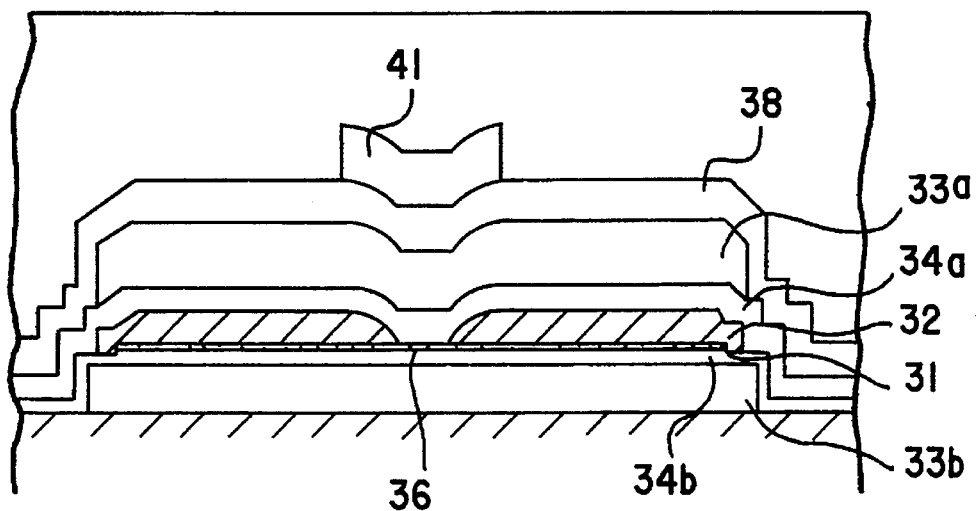
FIGS. 2A and 2B are bottom views of conventional heads.
Figure 2B:
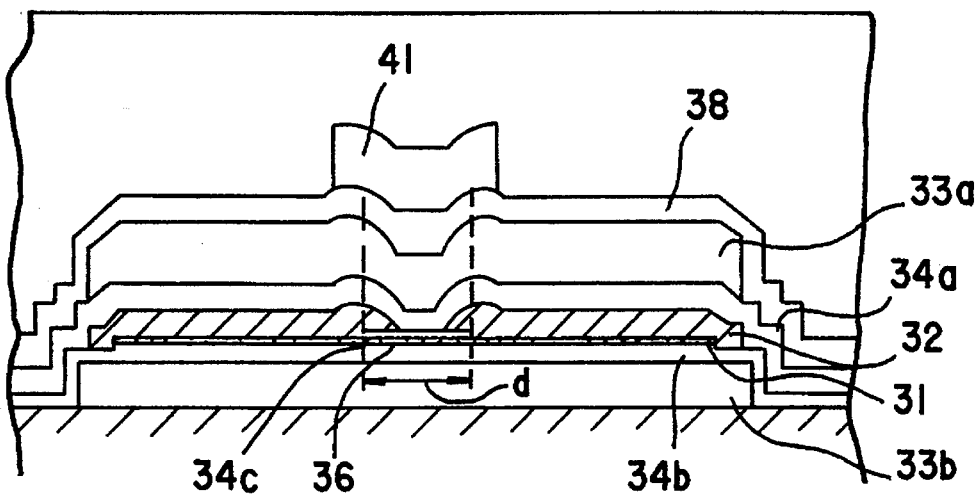
Figure 3A:
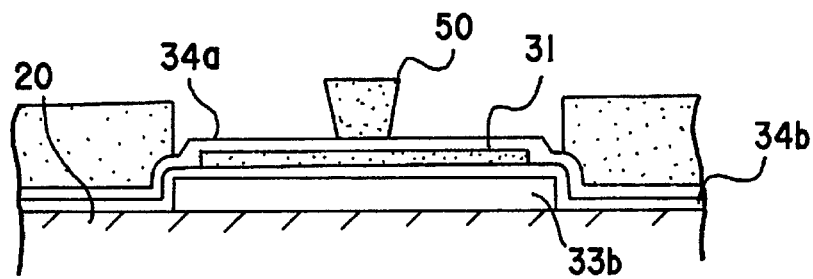
FIGS. 3A–3E show a process of fabricating the head of the present invention.

FIGS. 3A–3E are cross sectional views taken of a process of fabricating the magnetoresistance head of the present invention. Referring to FIG. 3A, the lower shield 33b made of, for example, NiFe, is formed on a non-magnetic substrate 20 made of alumina including titanium carbide, the substrate serving as a base of a slider. The $Al_2O_3$ non-magnetic insulating layer 34b is formed on the lower shield 33b. The MR element 31 made of a NiFe film and the $Al_2O_3$ non-magnetic insulating layer 34a are then formed. The insulating layer 34a is then provided with a resist pattern 50, having the shape of an inverted trapezoid, at a position at which a signal detection area is formed.

Figure 3B:
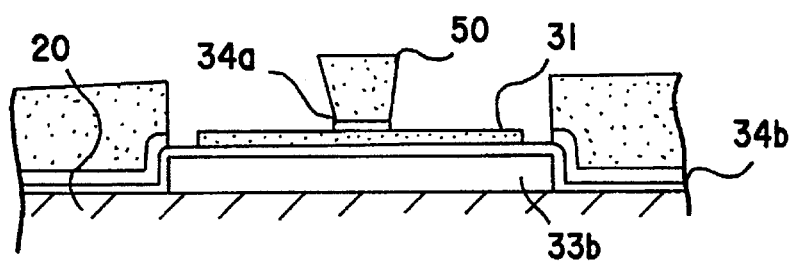

An anisotropic reactive ion etching is then performed on the insulating layer 34a by applying a fluorocarbon gas in Ar gas on the resist pattern 50 so that a state shown in FIG. 3B is obtained. The insulating layer 34a beneath the resist pattern 50 remains unetched.

Figure 3C:
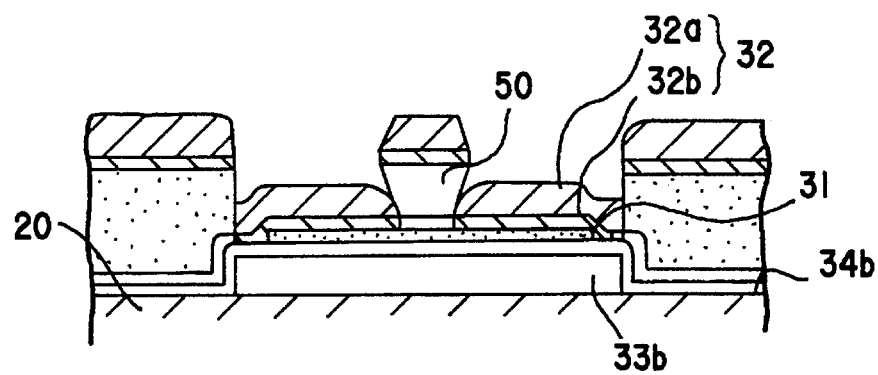

First Au layers 32a constituting the lead conductor layers 32 are formed by employing such a method as ion plating or sputtering that is characterized by excellent step coverage such that the first layers 32a have the same thickness as the insulating layer 34a. Second layers 32b constituting the lead conductor layers 32 are formed on top of the first layers 32a, by employing such a method as ion beam sputtering or evaporation that is characterized by poor step coverage, so that a state shown in FIG. 3C is obtained.

Figure 3D:
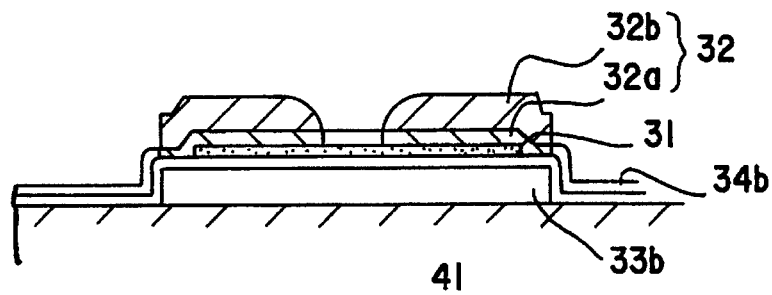
Figure 3E:
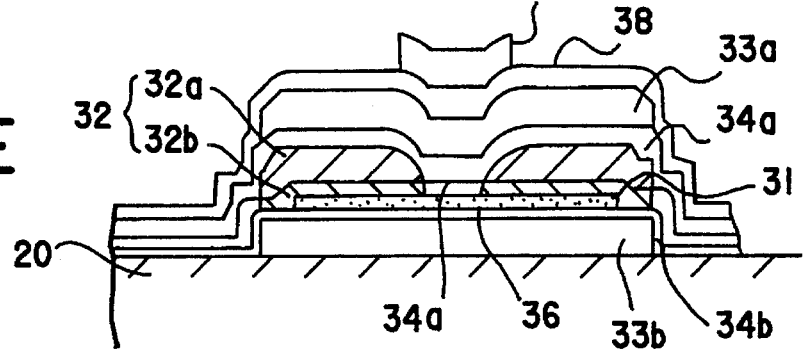

The resist pattern 50 is then lifted off so that a state shown in FIG. 3D is obtained. Thereafter, as shown in FIG. 3E, the non-magnetic insulating layer 34a made of $Al_2O_3$ is formed; the upper shield 33a made of a NiFe film is formed; the recording gap 38 formed by another non-magnetic insulating layer is made of $Al_2O_3$; and the upper magnetic pole 41 made of NiFe is formed.

Figure 4:
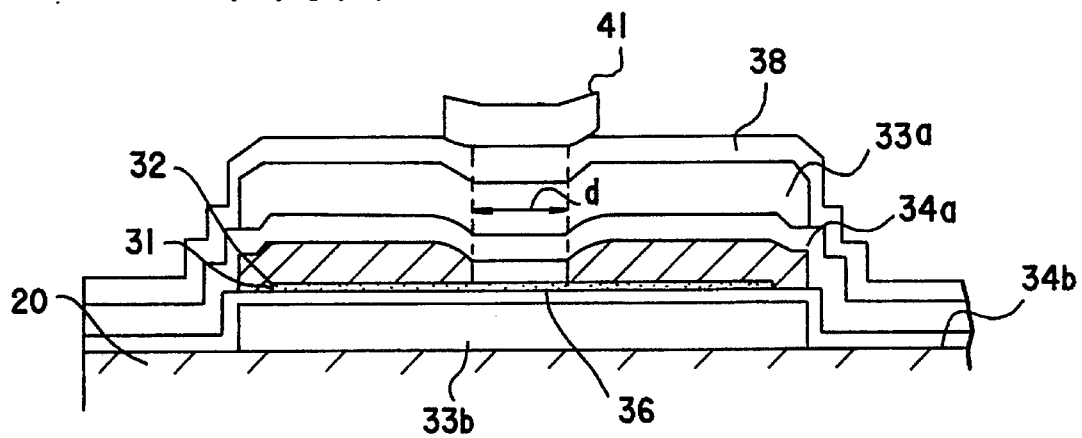
FIG. 4 is a bottom view of the head of the present invention.

FIG. 4 shows the MR head fabricated in accordance with the above-described method. Referring to FIG. 4, it will be noted that the ends of the lead conductor layers 32 which ends mark the boundaries of the signal detection area 36 are substantially perpendicular to the MR element 31, and are sloped in the vicinity of the upper shield 33a so that the lead conductor layers are thicker away from the signal detection area. As a result, the recording gap 38, formed between the upper shield 33a and the upper magnetic pole 41, is a regularly shaped gap over the width d of the signal detection area 36, the gap 38 being bounded by straight edges.

Making the ends of the lead conductor layers 32 perpendicular in the vicinity of the MR element 31 improves the precision with which the signal detection area is defined, and making the recording gap 38 a regularly shaped gap over the width d of the signal detection area 36 prevents the deterioration of the frequency characteristic.

Figure 5A:
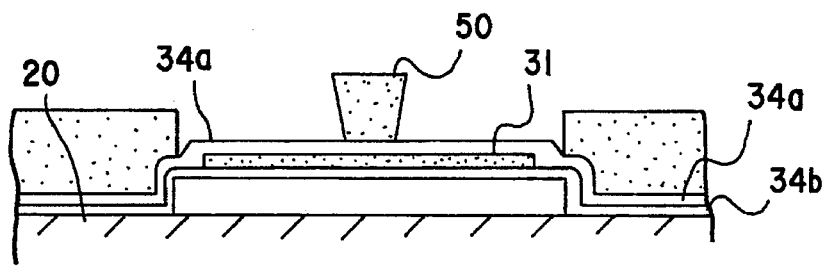
FIGS. 5A–5E show another process of fabricating the head of the present invention.

FIGS. 5A through 5E are cross sectional views of the process of fabricating another embodiment of the magnetoresistance head of the present invention. Referring to FIG. 5A, the lower shield 33b made of NiFe or the like is formed on the substrate 20, and the non-magnetic insulating layer 34b made of $Al_2O_3$ is formed on the upper shield. Thereafter, the MR element 31 made of a NiFe film is formed; the non-magnetic insulating layer 34a made of $Al_2O_3$ is formed; and the resist pattern 50 having the shape of an inverted trapezoid is formed at a position at which the signal detection area is formed.

Figure 5B:
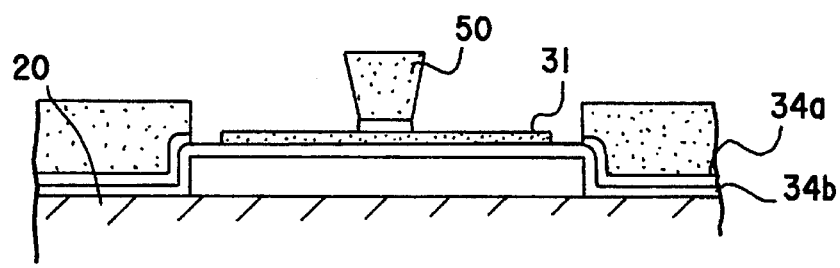

A reactive ion etching is then performed on the insulating layer 34a by applying a fluorocarbon gas in Ar gas on the resist pattern 50 so that a state shown in FIG. 5B is obtained. The insulating layer 34a beneath the resist pattern 50 remains unetched. These two steps are identical to those of FIGS. 3A and 3B.

Figure 5C:
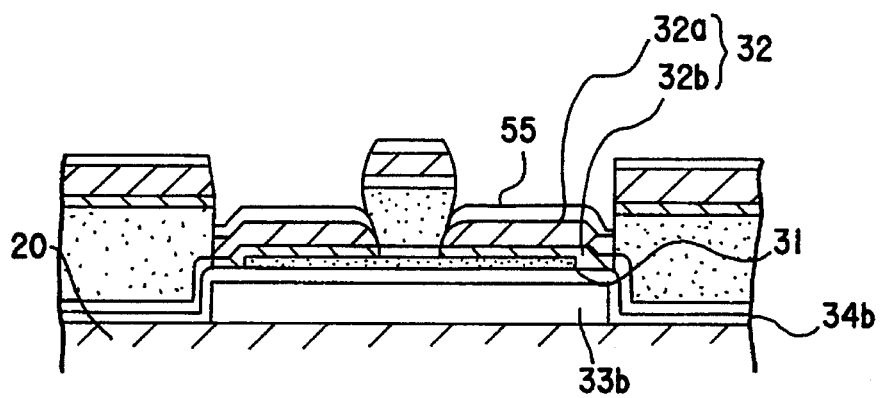

First Au layers 32a constituting the lead conductor layers 32 are formed by employing such a method as ion plating or sputtering that is characterized by excellent step coverage such that the first layers 32a have the same thickness as the insulating layer 34a. Second layers 32b constituting the lead conductor layers 32 are formed on top of the first layers 32a, by employing such method as ion beam sputtering or evaporation that is characterized by poor step coverage. An insulating film 55 made of $Al_2O_3$ or the like is then formed on the second layers 32a, so that a state shown in FIG. 5C is obtained.

Figure 5D:
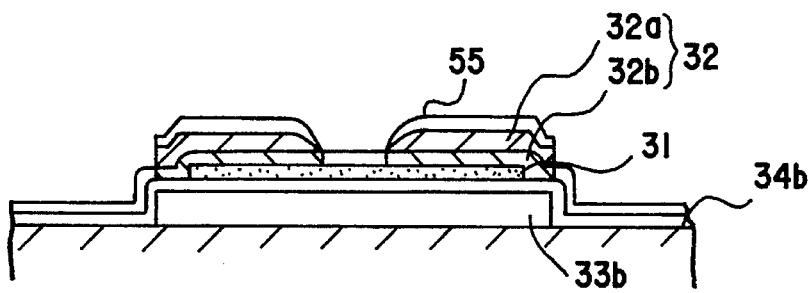
Figure 5E:
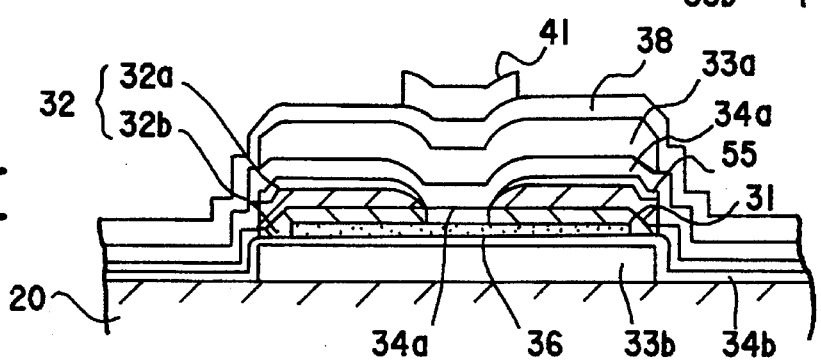

The resist pattern 50 is then lifted off so that a state shown in FIG. 5D is obtained. Thereafter, as shown in FIG. 5E, the non-magnetic insulating layer 34a made of $Al_2O_3$ is formed. The insulating layer 55 forms a part of the non-magnetic insulating film layer 34a. Thereafter, the upper shield 33a made of a NiFe film is formed; the recording gap 38 formed by another non-magnetic insulating layer is made of $Al_2O_3$; and the upper magnetic pole 41 made of NiFe is formed.

The above embodiment, in which the insulating film 55 is formed before the resist pattern 50 is lifted off, and in which a film of the non-magnetic insulating layer 34a is formed on top of the insulating film 55 after the resist pattern is lifted off, ensures that shorting between the lead conductor layers 32 and the upper shield 33a is prevented.

Figure 6:
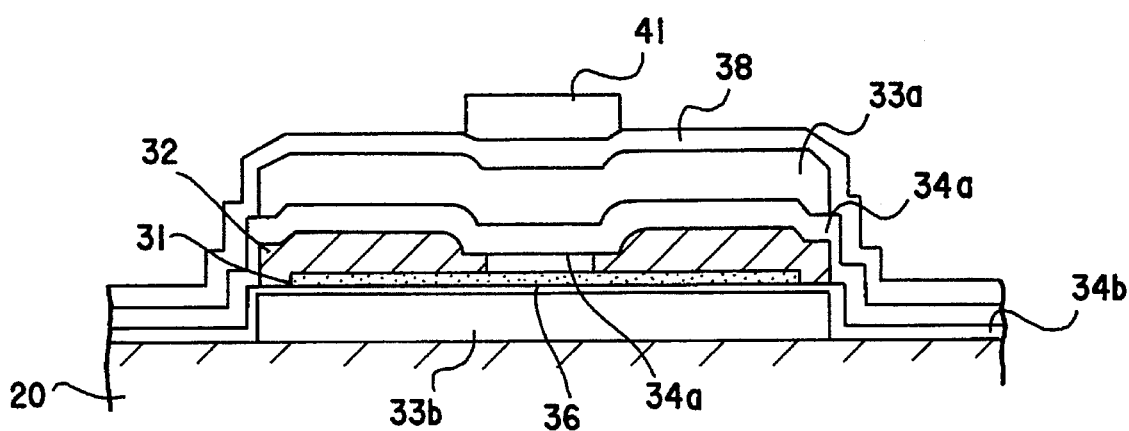
FIG. 6 is a bottom view of the head of the present invention.

While, in the embodiments of FIGS. 3A–3E and 5A–5E, the ends of the lead conductor layers 32 are sloped in the vicinity of the upper shield 33a such that the lead conductor layers 32 become gradually thicker away from the signal detection area 36, the lead conductor layers 32 may also be formed with steps horizontally away from the signal detection area 36, as shown in FIG. 6, so that a stepwise increase in the thickness of the lead conductor layers 32 results.

The lead conductor layers 32 may also be configured such that the first layers 32a are made of a metal such as Au, which is characterized by low resistivity, and that the second layers 32b are made of a metal such as W, which is characterized by low ductility. This configuration prevents a shorting between the lead conductor layers 32 and the upper shield 33a resulting from the lead conductor layers 32 being stretched due to the frictional drag exercised by the recording medium at the time of contact start and contact stop operations of the head. This configuration is also beneficial in that electrical resistance of the head can be made small because of low resistivity of the lead conductor layers 32 toward the lower shield 33b.

As has been described, it will be appreciated that the present invention provides a magnetoresistance head in which the precision, with which the signal detection area of the magnetoresistance element is defined, is improved, and in which the deterioration in the frequency characteristic is prevented because the recording gap is a regularly shaped gap over a spatial range corresponding to the signal detection area.

It will also be appreciated that the present invention provides a very useful method of fabricating a magnetoresistance head in which the ends of the lead conductor layers are substantially perpendicular in the vicinity of the magnetoresistance element and are sloped in the vicinity of the upper shield so that the lead conductor layers are thicker away from the signal detection area, and in which the recording gap is a regularly shaped gap at least over a spatial range corresponding to the signal detection area.

The present invention is not limited to the above described embodiments, and variations and modifications may be made without departing from the scope of the present invention.

What is claimed is:

1. A magnetoresistance head comprising:

a magnetoresistance element;

a pair of lead conductor layers connected to ends of said magnetoresistance element so as to define a signal detection area;

upper and lower shields sandwiching said magnetoresistive element and said lead conductive layer;

a first insulating layer residing between the upper shield and the lead conductor layers;

a second insulating layer residing between the lower shield and the magnetoresistance element; and an upper magnetic pole provided opposite said upper shield via a third insulating layer so as to form a recording gap;

wherein ends of the lead conductor layers, which ends mark the boundaries of said signal detection area, are substantially perpendicular in the vicinity of the magnetoresistance element, and are sloped in the vicinity of the upper shield so that the lead conductor layers become gradually thicker away from the signal detection area, and wherein said recording gap is a regularly shaped gap at least over a spatial range corresponding to the signal detection area.

2. A magnetoresistance head comprising:

a magnetoresistance element;

a pair of lead conductor layers connected to ends of said magnetoresistance element so as to define a signal detection area; upper and lower shields sandwiching said magnetoresistance element and said conductor layers;

a first insulating layer residing between the upper shield and the lead conductor layers;

a second insulating layer residing between the lower shield and the magnetoresistance element; and an upper magnetic pole provided opposite said upper shield via a third insulating layer so as to form a recording gap, wherein ends of the lead conductor layers, which ends mark the boundaries of said signal detection area, are substantially perpendicular in the vicinity of the magnetoresistance element, and are formed with steps in the vicinity of the upper shield so that the lead conductor layers become thicker stepwise away from the signal detection area, and wherein said recording gap is a regularly shaped gap at least over a spatial range corresponding to the signal detection area.

3. The magnetoresistance head as claimed in claim 1 or 2, wherein each of said lead conductor layers consists of a plurality of metal layers.

4. The magnetoresistance head as claimed in claim 3, in which each of said lead conductor layers comprises: a first metal layer having low resistivity formed so as to be in contact with the magnetoresistance element; and a second metal layer having low ductility formed on the first metal layer.

* * * * *